United States Patent
Sheng

(10) Patent No.: US 7,888,977 B2
(45) Date of Patent: Feb. 15, 2011

(54) ELECTRONIC DEVICE FOR SUPPLYING DC POWER

(75) Inventor: Kang Sheng, Taoyuan County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 23 days.

(21) Appl. No.: 12/478,730

(22) Filed: Jun. 4, 2009

(65) Prior Publication Data
US 2010/0253421 A1 Oct. 7, 2010

(30) Foreign Application Priority Data
Apr. 6, 2009 (TW) .............................. 98111417 A

(51) Int. Cl.
*H03K 3/00* (2006.01)
(52) U.S. Cl. ..................... 327/110; 327/112; 327/108
(58) Field of Classification Search .......... 327/110–112
See application file for complete search history.

(56) References Cited

U.S. PATENT DOCUMENTS

| 7,382,116 B2 * | 6/2008 | Endo et al. ................. 323/282 |
| 7,746,935 B2 * | 6/2010 | Bonfiglio .................... 375/242 |
| 2003/0058006 A1 * | 3/2003 | Srikanth et al. ............. 327/108 |
| 2009/0140780 A1 * | 6/2009 | Miyazaki et al. ............ 327/112 |
| 2010/0019807 A1 * | 1/2010 | Zhang et al. ................ 327/109 |
| 2010/0123485 A1 * | 5/2010 | Lee ............................ 327/109 |

* cited by examiner

*Primary Examiner*—Lincoln Donovan
*Assistant Examiner*—Ryan C Jager
(74) *Attorney, Agent, or Firm*—Winston Hsu; Scott Margo

(57) ABSTRACT

An electronic device for delivering DC power includes a load, a power end, an upper gate switch including a first end coupled to the power, a second end, and a third end, for conducting connection between the first and third ends according to the signal level of the second end, a lower gate switch including a first end coupled to the third end of the upper gate switch, a second end, and a third end coupled to ground, for conducting connection between the first and third ends according to the signal level of the second end, an inductor, and a switch control unit, coupled to the second end of the upper gate switch and the second end of the lower gate switch, for switching the upper gate switch between an ON state and an OFF state, and switching the lower gate switch between an ON state and a semi-ON state.

15 Claims, 13 Drawing Sheets

| LOGIC2 | LOGIC3 | Output of normal state control unit 602 |
|---|---|---|
| 0 | 1 | 1 |
| 0 | 0 | 1 |
| 1 | 1 | Hi-Z |
| 1 | 0 | 0 |

FIG. 6

ELECTRONIC DEVICE FOR SUPPLYING DC POWER

BACKGROUND OF THE INVENTION

1. Field of the Invention

The present invention is related to an electronic device capable of supplying direct current (DC) power, and more particularly, to an electric device which can supply DC power with low electromagnetic interference (EMI) functions.

2. Description of the Prior Art

As the information technology advances, various kinds of electronic devices are getting popular. Inside each electronic device, numerous types of voltage supplying circuits are utilized to provide the DC (direct current) power for the operating needs of the electronic devices. The most popular DC power supply devices can be classified into two main categories, the linear regulator and the switching power supply. The switching power supply is also called the switching regulator. Compared with the linear regulator, the switching power supply can have better power transfer efficacy, and is widely used in portable electronic devices. Besides that, another tendency is that many more complex and novel functions are being built into portable electronic devices, and the electronic circuit board are designed to be smaller and lighter. The consequences are the density of the electronic circuitry is getting higher, and the electromagnetic interference (EMI) issues among the components upon the electronic circuit board are getting more serious and becoming one of the major design challenges.

About the electromagnetic interference (EMI) come up with a working switching power supply, please refer to FIG. 1, which illustrates a schematic diagram of a switching power supply circuit 10. The switching power supply circuit 10 comprises a power supply 100, a switching controller 102, an upper gate switch M1, a lower gate switch M2, an inductor L1, a capacitor C1 and a load LOAD1. The switching controller 102 controls the electric power transferring from the power supply 100 to the inductor L1 by changing the duty cycle of the switching operation. When the upper gate switch M1 turns on, the inductor current IL1 flowing through the inductor L1 will increase owing to more magnetic energy being stored in the inductor L1. When the inductor current IL1 reaches a predefined upper current bound, the switching controller 102 will immediately turn off the upper gate switch M1, such that the magnitude of the inductor current IL1 can keep falling till the end of the switching cycle. By this way, the power switching circuit 10 can keep the output voltage stable by controlling the on-off actions of the upper gate switch M. Noteworthily, the switch power supply circuit 10 can further turn the lower gate switch M2 on while the upper gate switch M1 is turned off, such that a path for conducting current can be made through loop containing the inductor L1, the load, and the ground GND. Therefore, the continuity of the inductor current IL1 can be maintained. And, FIG. 2 illustrates the loop for conducting current when the lower gate switch M2 is turned on with a dashed arrow sign.

However, when the load LOAD1 of the switching power supply circuit 10 becomes a light load, the duty cycle of the upper gate switch M1 can fall below 10%. Under this condition, for each of the operating cycle, after the upper gate switch M1 turns on for a very short period of time, the lower gate switch M2 will also turn on for a very short of time to prevent the occurrence of the reverse current. However, the fast switching actions of the lower gate switch M2 will result in some negative effect on the operations of the switching power supply circuit 10, such as producing electromagnetic interference (EM1). Please refer to FIG. 3, which illustrates a schematic diagram of the voltage waveform at an endpoint SW of the inductor L1 when the load LOAD1 of the switching power supply circuit 10 becomes a light load. According to the measurements obtained from the experiment, when the load LOAD1 becomes a light load, the upper gate switch M1 and the lower gate switch M2 are expected to stay in the OFF condition for a much longer period of time than it is not a light load. Meanwhile, after the lower gate switch M2 follows the upper gate switch M1 and completes a short OFF->ON->OFF action, the voltage waveform in the endpoint SW of the inductor L1 will produce a large high frequency oscillation, this type of oscillating electromagnetic energy will apply influence on the operations of components neighboring to the switching power supply circuit 10 and the inductor L1, and is considered as an EM1 source. Under certain circumstances, to prevent the operations of the switching power supply circuit 10 to produce the electromagnetic interference (EM1) phenomena and reliability issues becomes very critical, further research efforts are thus required to provide effective solutions to overcome this kind of problem.

SUMMARY OF THE INVENTION

It is therefore a primary objective of the claimed invention to provide an electronic device capable of supplying direct current (DC) power with low electromagnetic interference (EMI) functions.

The present invention discloses an electronic device for delivering DC power, which comprises a load, a power end, for receiving a power of high voltage level, an upper gate switch, comprising a first end coupled to the power end, a second end, and a third end, for conducting connection between the first end and the third end according to the signal level of the second end, a lower gate switch, comprising a first end coupled to the third end of the upper gate switch, a second end, and a third end coupled to a ground, for conducting connection between the first end and the third end according to the signal level of the second end, an inductor, comprising an end coupled to the third end of the upper gate switch and the first end of the lower gate switch, and another end coupled to the load, and a switch control unit, coupled to the second end of the upper gate switch and the second end of the lower gate switch, for switching the upper gate switch between an ON state and an OFF state, and switching the lower gate switch between an ON state and a semi-ON state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates a truth table corresponding to operations of a normal state control unit.

DETAILED DESCRIPTION

Figure 4:
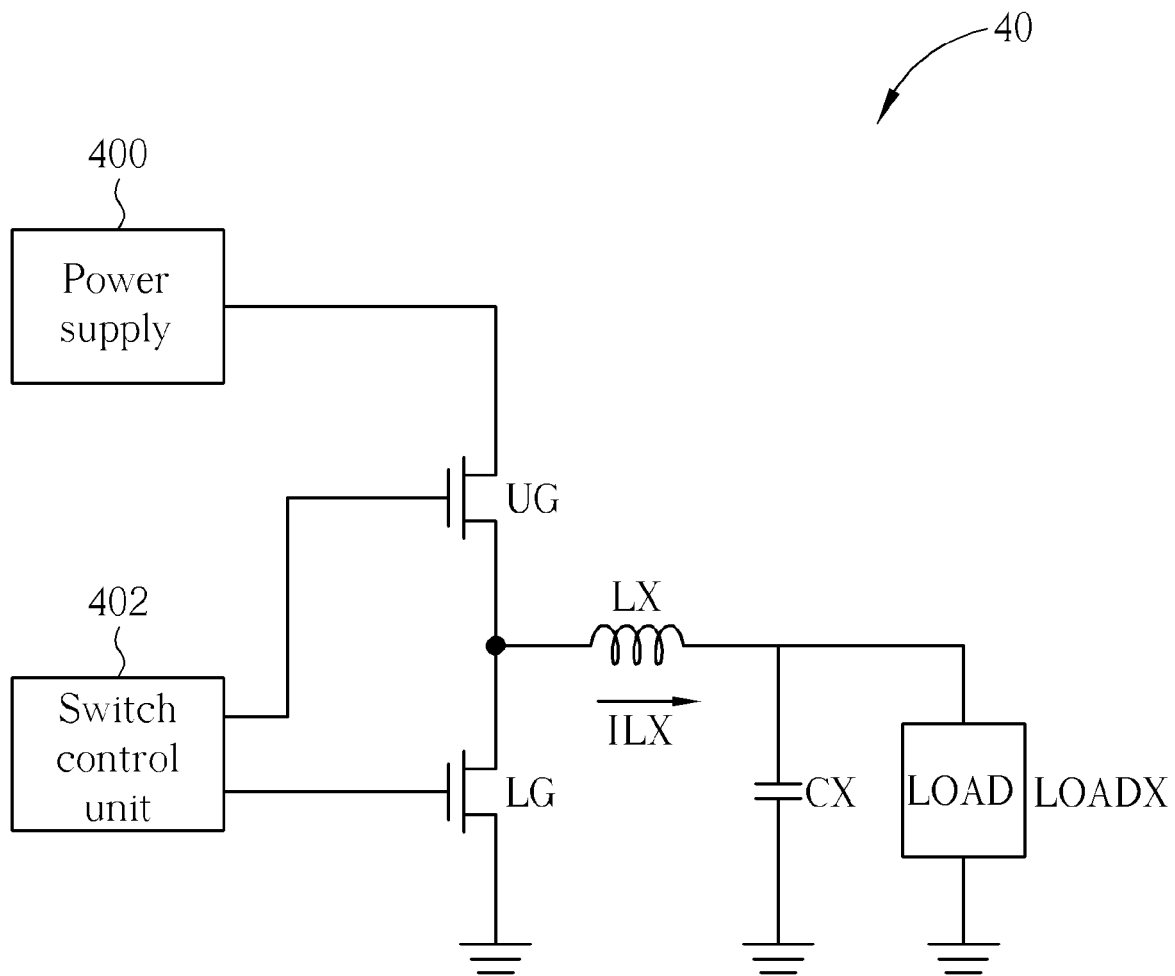
FIG. 4 illustrates a switching power supply circuit according to an embodiment of the present invention.

Please refer to FIG. 4, which illustrates a switching power supply circuit 40 according to an embodiment of the present invention. The switching power supply circuit 40 comprises a power supply 400, a switch control unit 402, an upper gate switch UG, a lower gate switch LG, an inductor LX, a capacitor CX and a load LOADX. The architecture of the switching power supply circuit 40 is similar to that of the switching power supply circuit 10. However, the present invention utilizes the operating characteristics of MOSFET, and adopts a specially designed operating function to control the ON-OFF operation of the upper gate switch UG, to have the lower gate switch LG switched between an ON state and a semi-ON state, so as to prevent the high frequency electromagnetic interference problem, while changing from a heavy load to a light load, such that the high frequency electromagnetic interference produced by the lower gate switch LG can be avoided. Preferably, the semi-ON state is fulfilled by parking the gate voltage of the lower gate switch LG in the sub-threshold voltage. To detail more, after the upper gate switch completes an ON-OFF operation (an ON-OFF operation means the switch starting from OFF to ON, and then back to OFF), the switch control unit 402 will turn on the lower gate switch for a short period of time, and then the switch control unit 402 will be back to the semi-ON state till the end of the switching cycle. When the lower gate switch LG operates in the semi-ON state, a tiny current will be conducted from the inductor LX, through the lower gate switch LG to the ground, so the remaining magnetic energy stored in the inductor LX can be directed to the ground smoothly, and won't produce high frequency electromagnetic oscillations. According to the present invention, the high frequency electromagnetic oscillations can be avoided and the electromagnetic interference can be greatly decreased by not turning both the upper and lower gate switches off.

Figure 5:
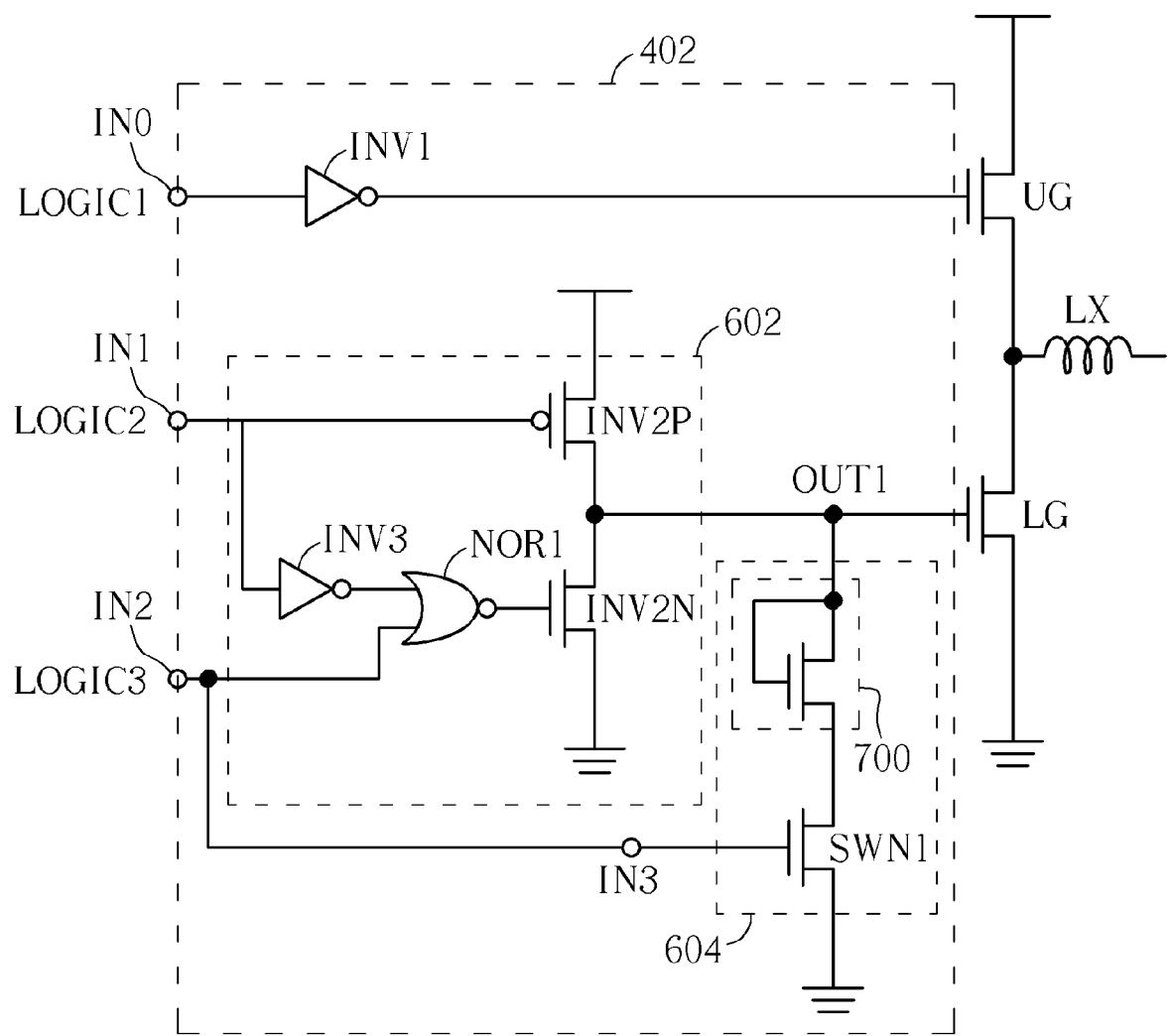
FIG. 5 illustrates a schematic diagram of a switch control unit according to an embodiment of the present invention.

To implement the concept stated above, please refer to FIG. 5, which illustrates a schematic diagram of the switch control unit 402 according to an embodiment of the present invention. The switch control unit 402 comprises an inverter INV1, a normal state control unit 602 and a sub-threshold control unit 604 to switch the lower gate switch between an ON state and a semi-On state. The inverter INV1 receives the signal LOGIC1 via an input end IN0, to control the upper gate switch UG. The normal state control unit 602 receives the signals LOGIC2 and LOGIC3 via the input ends IN1 and IN2, respectively. The signals LOGIC2 and LOGIC3 are utilized for controlling the signal levels and states of the output end OUT1 of the normal state control unit 602, so the output of the end OUT1 can be switched between a HIGH and a LOW state, or to a state of high impedance (Hi-Z). Next, the sub-threshold control unit 604 can receive the signal LOGIC3 via an input end IN3, and be used to control the output of the sub-threshold control unit 604 to switch between a sub-threshold voltage and a state of high impedance (Hi-Z). Therefore, the signals LOGIC1, LOGIC2 and LOGIC3 can respectively control the ON-OFF operations of the upper and lower gate switches UG and LG, and make the lower gate operated in a semi-ON state.

To detail further, the normal state control unit 602 comprises an inverter INV2P, a switch INV2N, an inverter INV3 and a NOR gate NOR1. The switch INV2P is a p-type MOSFET, the switch INV2N is an n-type MOSFET. The inverter INV3 and the NOR gate NOR1 are used for performing logic operations. Please refer to FIG. 6, which illustrates a truth table corresponding to the operations of the normal state control unit 602. By changing the logic levels of the signals LOGIC2 and LOGIC3, the output of the normal state control unit 602 can be controlled. When LOGIC2=1 and LOGIC3=1, the output of the normal state control unit 602 is in a high impedance state (Hi-Z) state, which represents the output of the normal state control unit 602 will not affect the OFF operation of the lower gate switch LG (but can still affect the ON operations under some conditions), and will be controlled by the output of the sub-threshold control unit 604. When LOGIC3=0, the output state of the sub-threshold control unit 604 is in the high impedance (Hi-Z) state, which represents the normal state control unit 602 can solely control the operations of the lower gate switch LG. Please again refer to FIG. 5, the sub-threshold control unit 604 comprises a switch SWN1 and a voltage gap unit 700. The switch SWN1 is an n-type MOSFET. When LOGIC2=1 and LOGIC3=1, the voltage gap unit 700 will control the signal level in the output end OUT1. Preferably, the voltage gap unit 700 comprises a diode-connected n-type MOSFET or comprises simply a diode, wherein the "diode connected" means the drain and the gate of the MOSFET are being shorted, and behaves as a diode. According to the truth table depicted in FIG. 6, the switch control unit 402 can make the lower gate switch LG to be operated in an ON state, a semi-ON state or an OFF state.

Briefly speaking, according to FIG. 5, the switch control unit 402 is to apply the signal LOGIC1 to independently control the ON-OFF operations of the upper gate switch. Besides that, when the signal LOGIC3=0, the output of the sub-threshold control unit 604 will be disabled (Hi-Z), and the signal LOGIC2 is used to control the ON-OFF operations of the lower gate switch LG. Finally, when LOGIC2=1 and LOGIC3=1, the lower gate switch can be operated in a semi-ON state. Therefore, whenever a switching cycle initiates, the upper gate bridge will complete an ON operation (LOGIC1=1, LOGIC2=1, and LOGIC3=0) and then turned off; after that, the lower gate switch LG will perform an ON operation (LOGIC1=0, LOGIC2=0 and LOGIC3=0), and finally the lower gate switch LG will be switched back to the semi-ON state (LOGIC1=0, LOGIC2=1 and LOGIC3=1).

Figure 7:
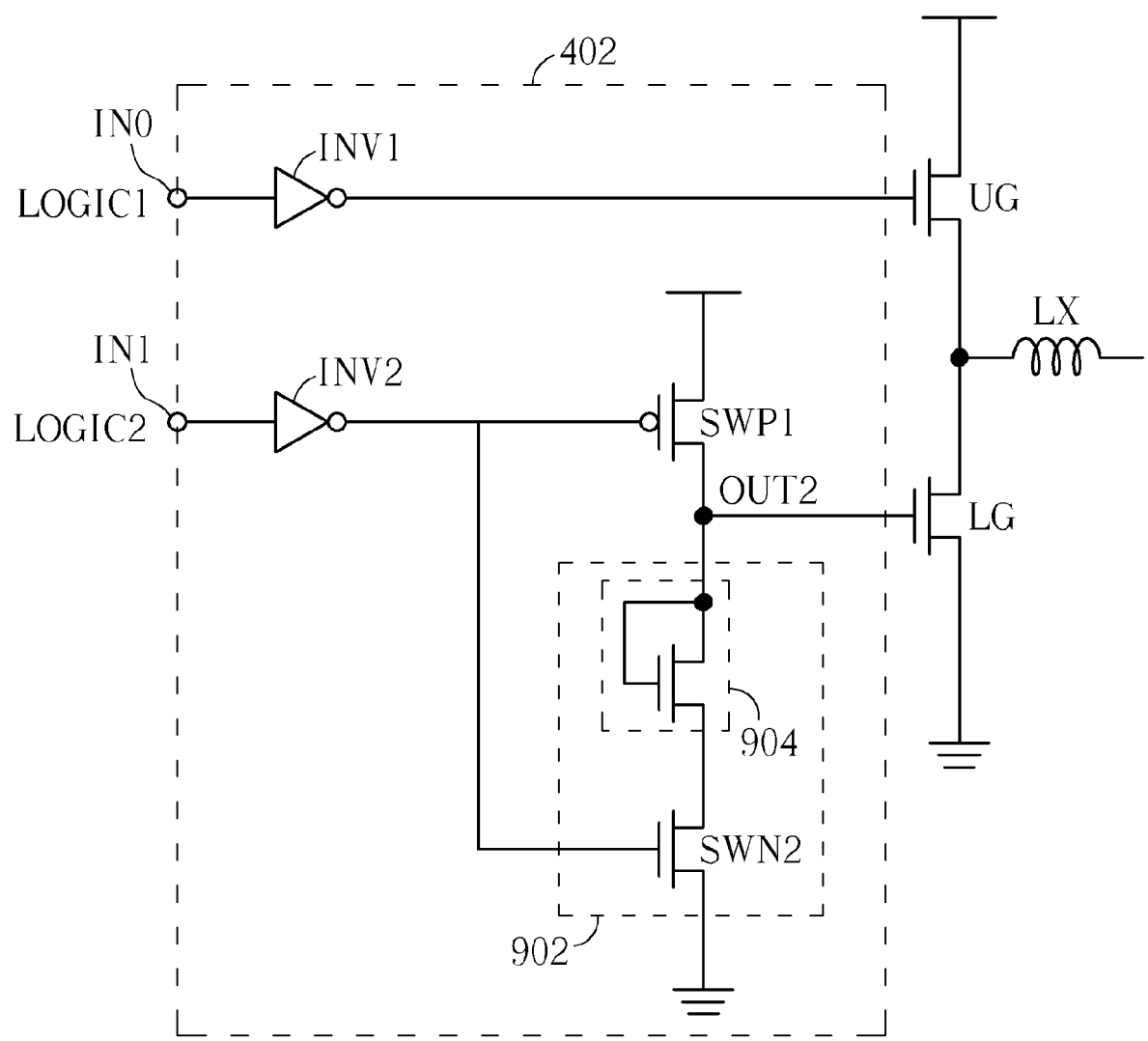
FIG. 7 illustrates another embodiment of a switch control unit.

Furthermore, please refer to FIG. 7, which illustrates another embodiment of the switch control unit 402. According to FIG. 7, the switch control unit 402 comprises two inverters INV1 and INV2, a switch SWP1 and an upward voltage control unit 902. The inverter INV1 receives a signal LOGIC1 via an input end IN0, to control the upper gate switch UG. The inverter INV2 receives a signal LOGIC2 via an input end IN1. The switch SWP1 is used to control the signal connection between an output end OUT2 and the power end, and is designed to be a p-type MOSFET SWP1. When the gate voltage of the p-type MOSFET SWP1 is switched to a low voltage level, the transistor SWP1 will be turned on, such that the lower gate switch LG will be turned on completely. On the other hand, when the gate voltage of the p-type MOSFET SWP1 is switched to a high voltage level, the transistor will be turned off, and the drain of the p-type MOSFET SWP1 will be floating, or in a high impedance (Hi-Z) state, such that the voltage of the output end OUT2 can then be decided solely by the output of the upward voltage control unit 902. The upward voltage control unit 902 comprises an enable switch SWN2 and a voltage gap unit 904. Preferably, the enable switch SWN2 is an n-type MOSFET (NMOS), and the voltage gap unit 904 is a diode-connected n-type MOSFET or simply a diode. When the gate voltage of the enable switch SWN2 is switched to a high voltage level, the enable switch SN2 will be turned on, and the voltage level of the output end OUT2 will be decided by the voltage gap unit 904. Therefore, the switch control unit 402 can control the lower gate switch LG to switch between an ON state and a semi-On state, no matter the load is in a heavy load or a light load condition.

Figure 8:
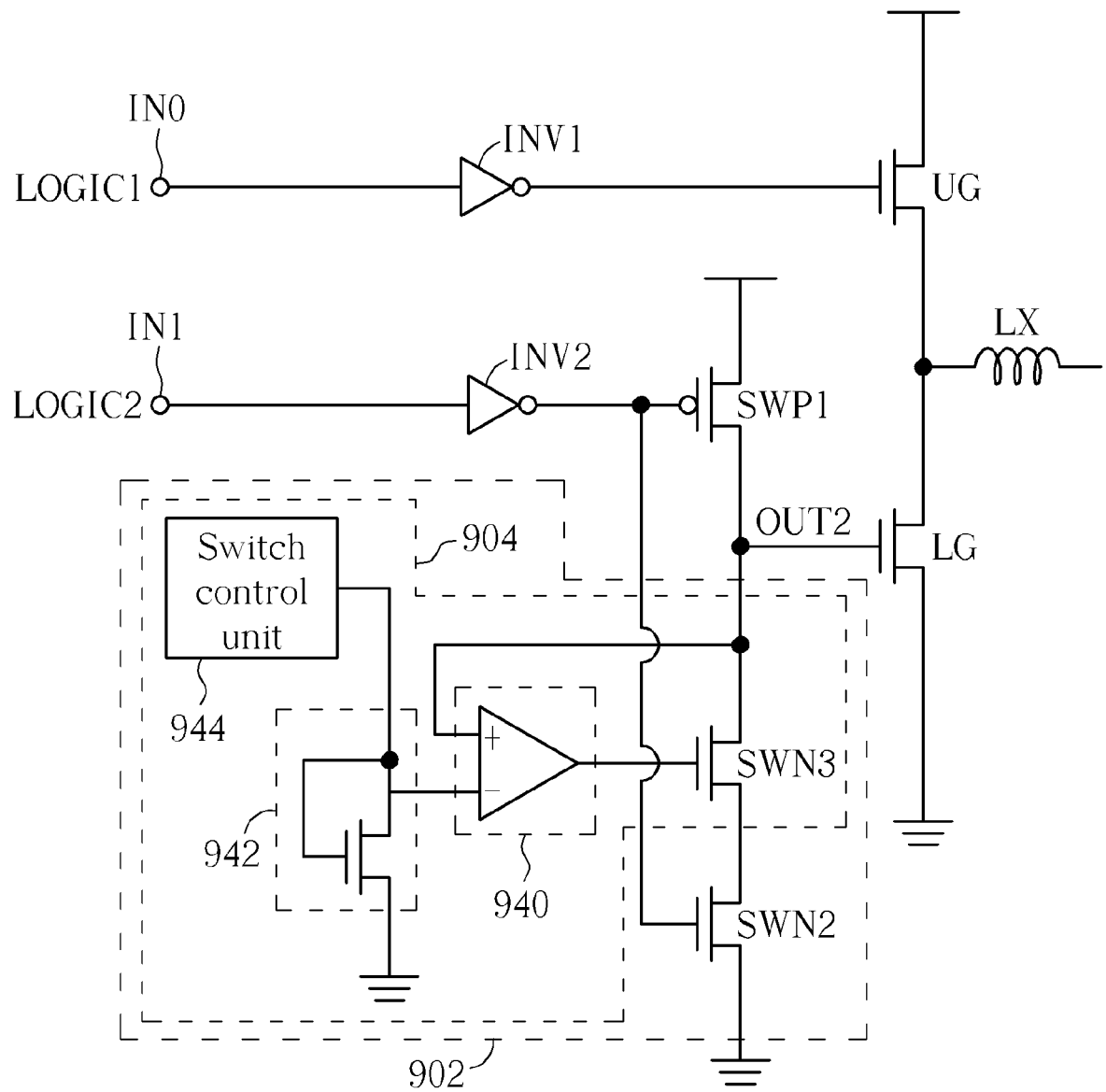
FIG. 8 illustrates an alternative embodiment of a voltage gap unit.
Figure 9:
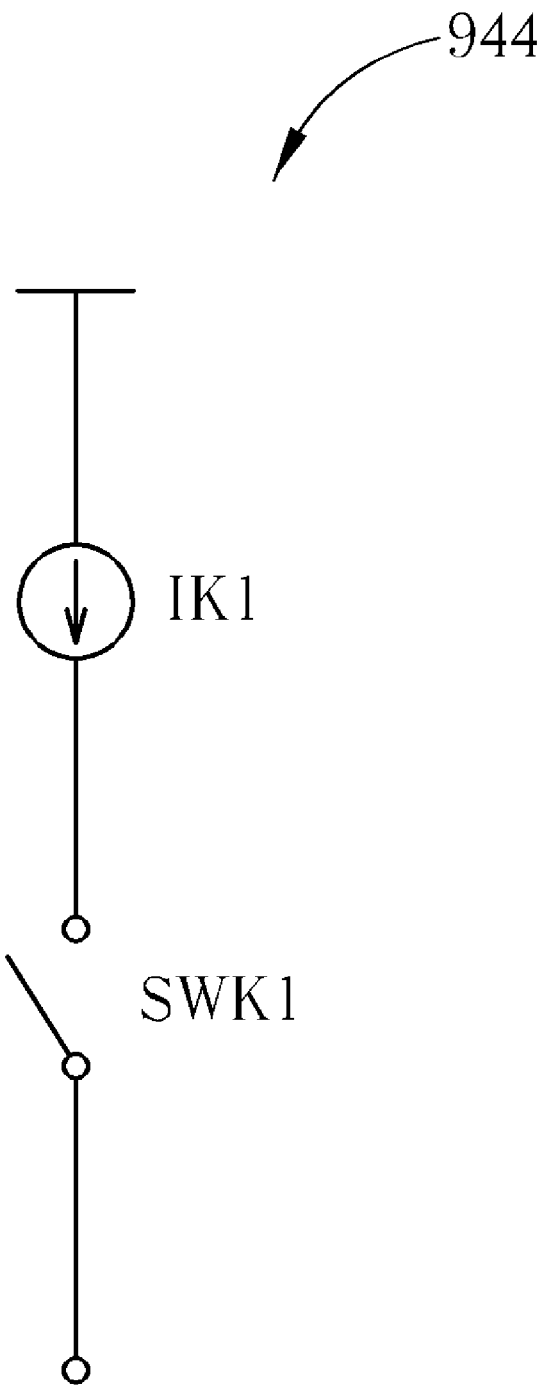
FIGS. 9 and 10 illustrate schematic diagrams of current control unit according to an embodiment of the present invention.
Figure 10:
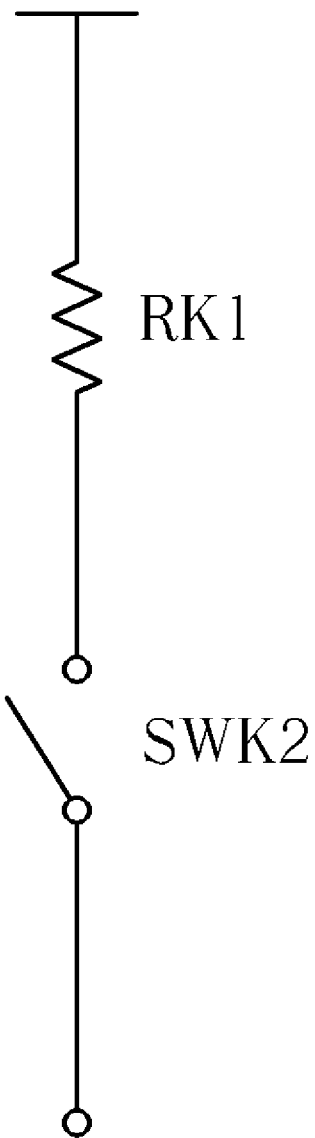
Figure 11:
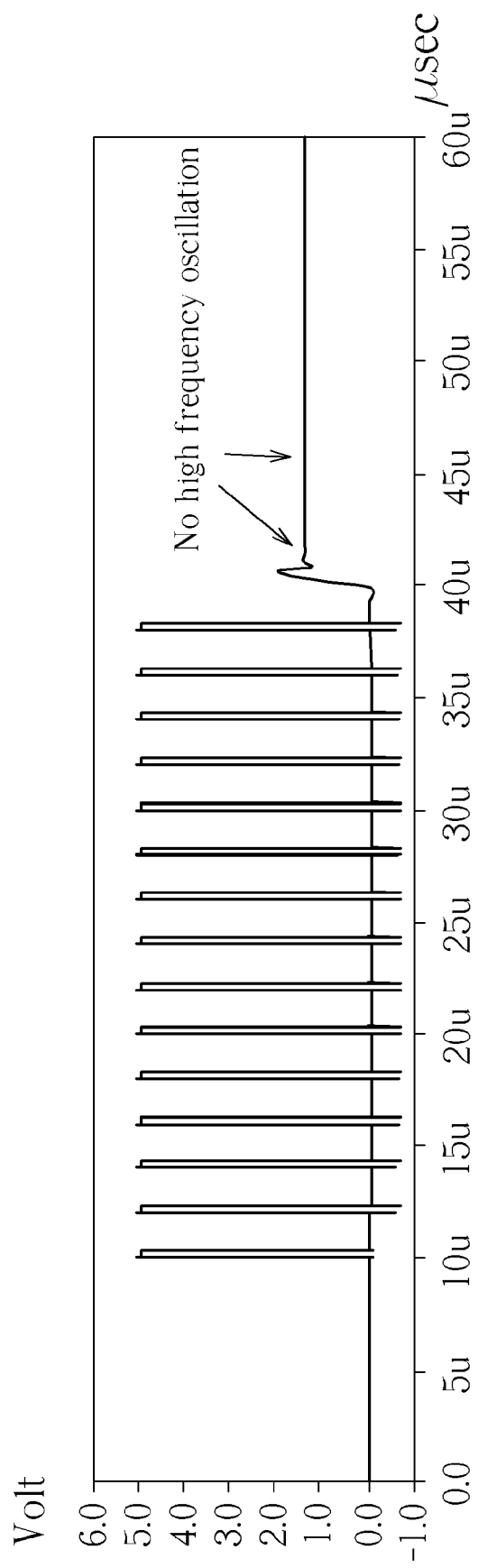
FIG. 11 illustrates a timing diagram of a voltage at an endpoint of an inductor in FIG. 4 when a load of the switching power supply circuit of FIG. 4 changing from heavy load to light load.

Please refer to FIG. 8, which illustrates an alternative embodiment of the voltage gap unit 904. According to FIG. 8, the voltage gap unit 904 comprises an operational amplifier 940, a voltage reference unit 942, a current control unit 944 and a switch SWN3. The operational amplifier 940 will work with the voltage reference unit 942, and use the switch SWN3 to constitute a control loop, such that the voltage level at the output end OUT2 can be steadily kept in a sub-threshold level. The current control unit 944 is used for providing a proper bias current to the voltage reference unit 942. To detail more, the current control unit can be made according to FIG. 9, which comprises a current source IK1 connected in series with a switch SWK1, or can be made according to FIG. 10, which comprises a resistor RK1 connected in series with a switch SWK2. The voltage reference unit 942 can be a diode-connected n-type MOSFET or a diode, and the switch SWN3 can be an n-type MOSFET. Other materials about the operating principles of the lower gate switch LG have been stated, and won't be detailed further.

Briefly speaking, the switch control unit 402 as illustrated in FIG. 7 is to use the signal LOGIC1 to independently control the ON-OFF operations of the upper gate switch UG, and use the signal LOGIC2 to control the ON-OFF operation of the lower gate switch LG. Whenever a switching cycle initiates, the upper gate switch UG will complete an ON operation (LOGIC1=1 and LOGIC2=0) and then turned off; after that, the lower gate switch LG will perform an ON operation (LOGIC1=0 and LOGIC2=1) and back to the semi-ON state. Noticeably, the lower gate switch LG will never be completely off, and only switch between the ON state and the semi-ON state according to this embodiment of the present invention.

Figure 1:
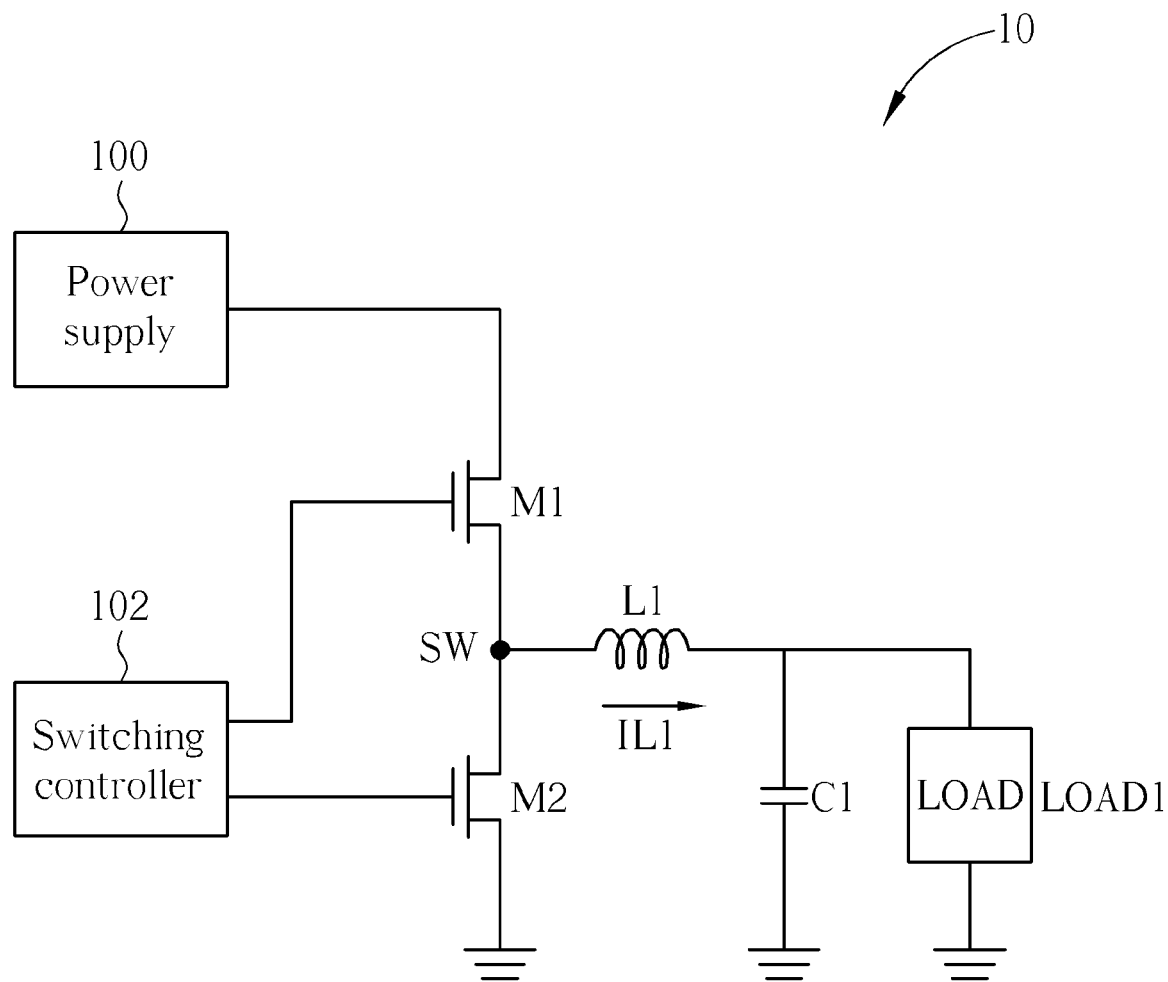
FIG. 1 illustrates a schematic diagram of a switching power supply circuit in the prior art.
Figure 2:
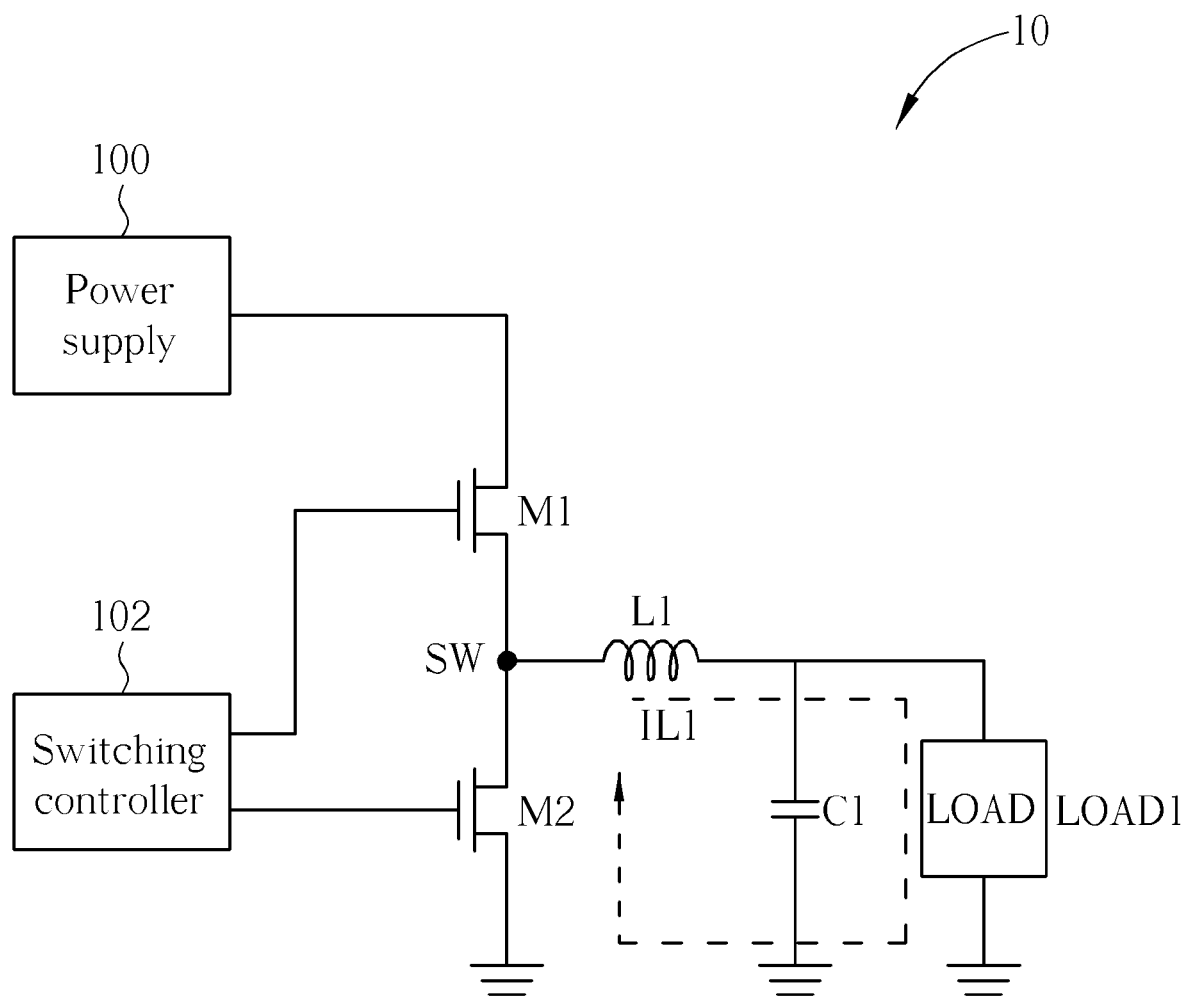
FIG. 2 illustrates a conducting current loop when a lower gate switch in FIG. 1 is turned on with a dashed arrow.
Figure 3:
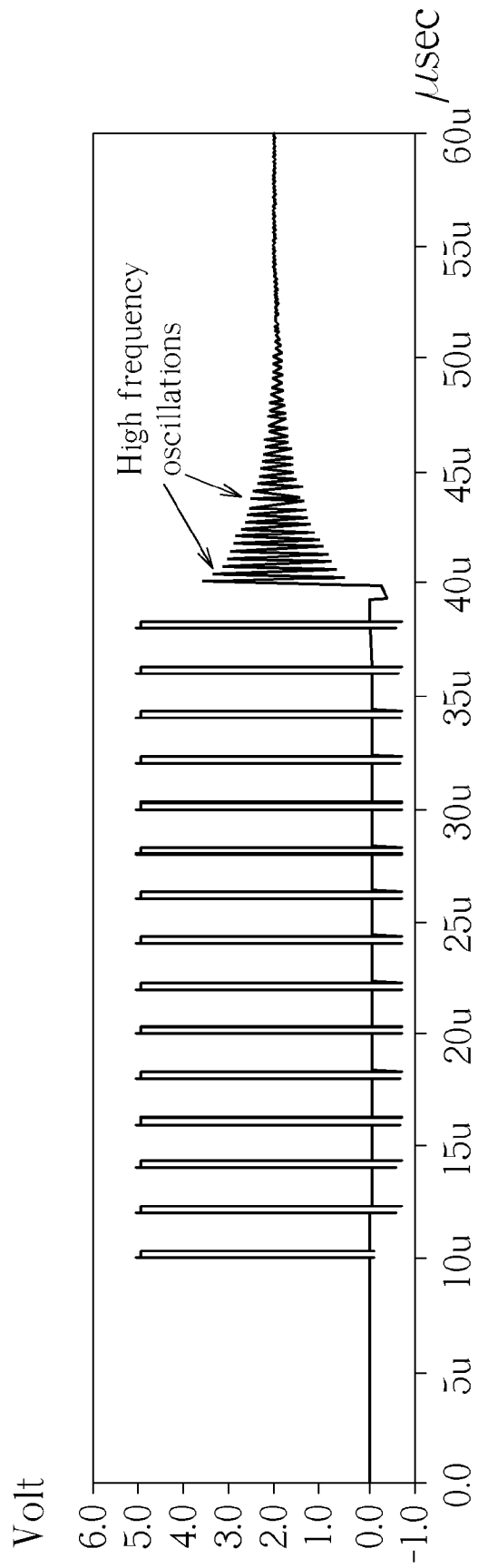
FIG. 3 illustrates a schematic diagram of a voltage waveform at an endpoint of an inductor in FIG. 1 when a load of the switching power supply circuit of FIG. 1 becomes a light load.

Please refer to FIG. 1, which illustrates a timing diagram of the voltage at an endpoint SWX of the inductor LX when the load LOADX of the switching power supply circuit 40 changing from heavy load to light load, wherein the endpoint SWX is close to the upper gate switch UG. Compared with FIG. 3, the high frequency electromagnetic oscillation happened when changing from the heavy load to light load (approximately at 40 μSec in the axis of time) is basically disappeared, and the electromagnetic interference has been greatly decreased.

Figure 12:
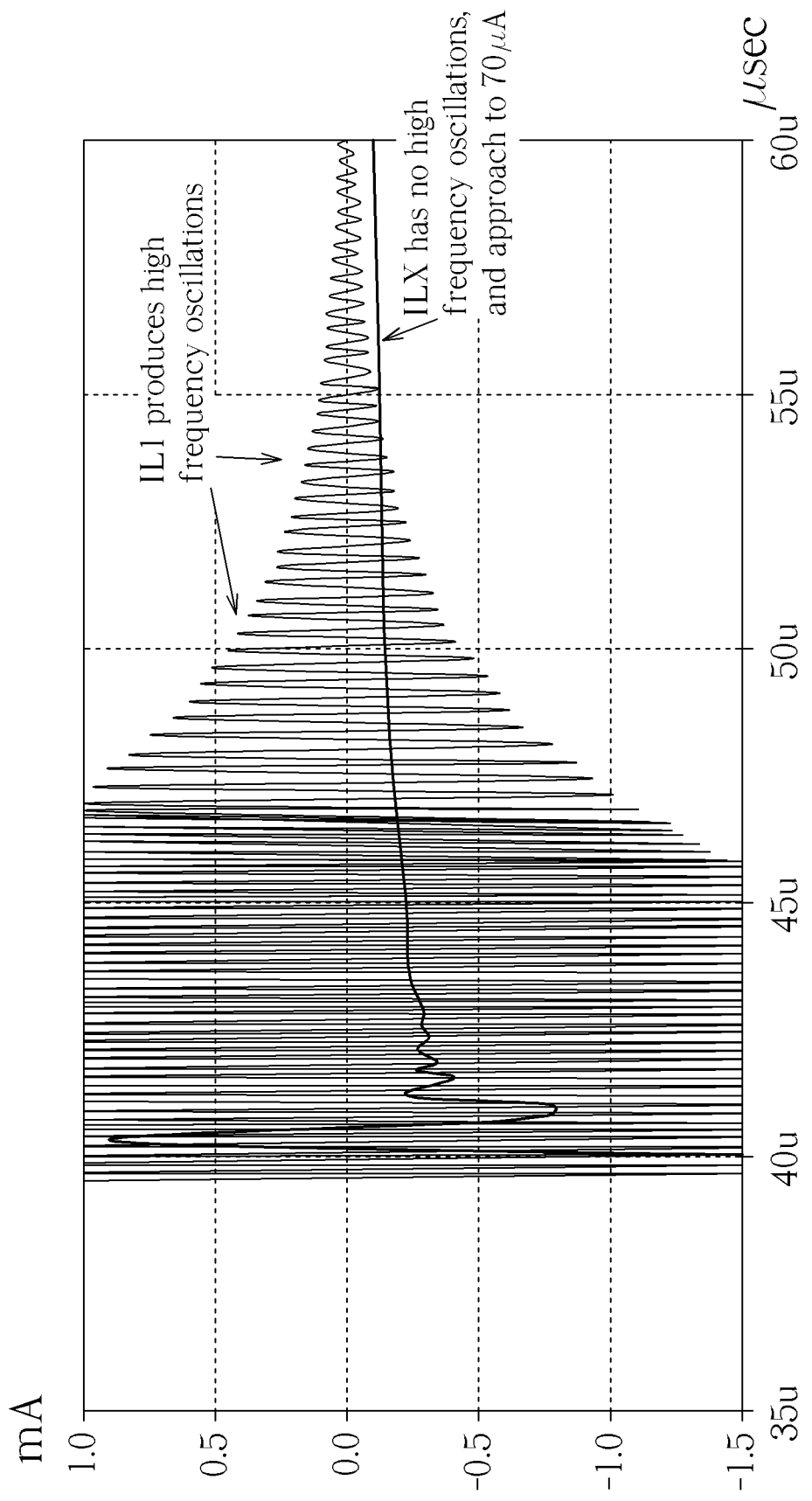
FIG. 12 illustrates a timing diagram which compares an inductor current belonging to the switching power supply circuit of FIG. 4 and an inductor current belonging to the switching power supply circuit of FIG. 1.

Please refer to FIG. 12, which illustrates a timing diagram which compares the inductor current ILX belonging to the switching power supply circuit 40 of the present invention and the inductor current IL1 belonging to the switching power supply circuit 10 according to the prior art. According to FIG. 12, the inductor current IL1 will present a large oscillation after changing from heavy load to light load (approximately starting at 40 μSec). Also, according to FIG. 12, the inductor current ILX of the present invention will approach smoothly to a current value; this tiny current (about 70 μA) indicates the magnetic energy stored in the inductor LX is approaching a tiny energy level which won't generate large electromagnetic oscillation.

Figure 13:
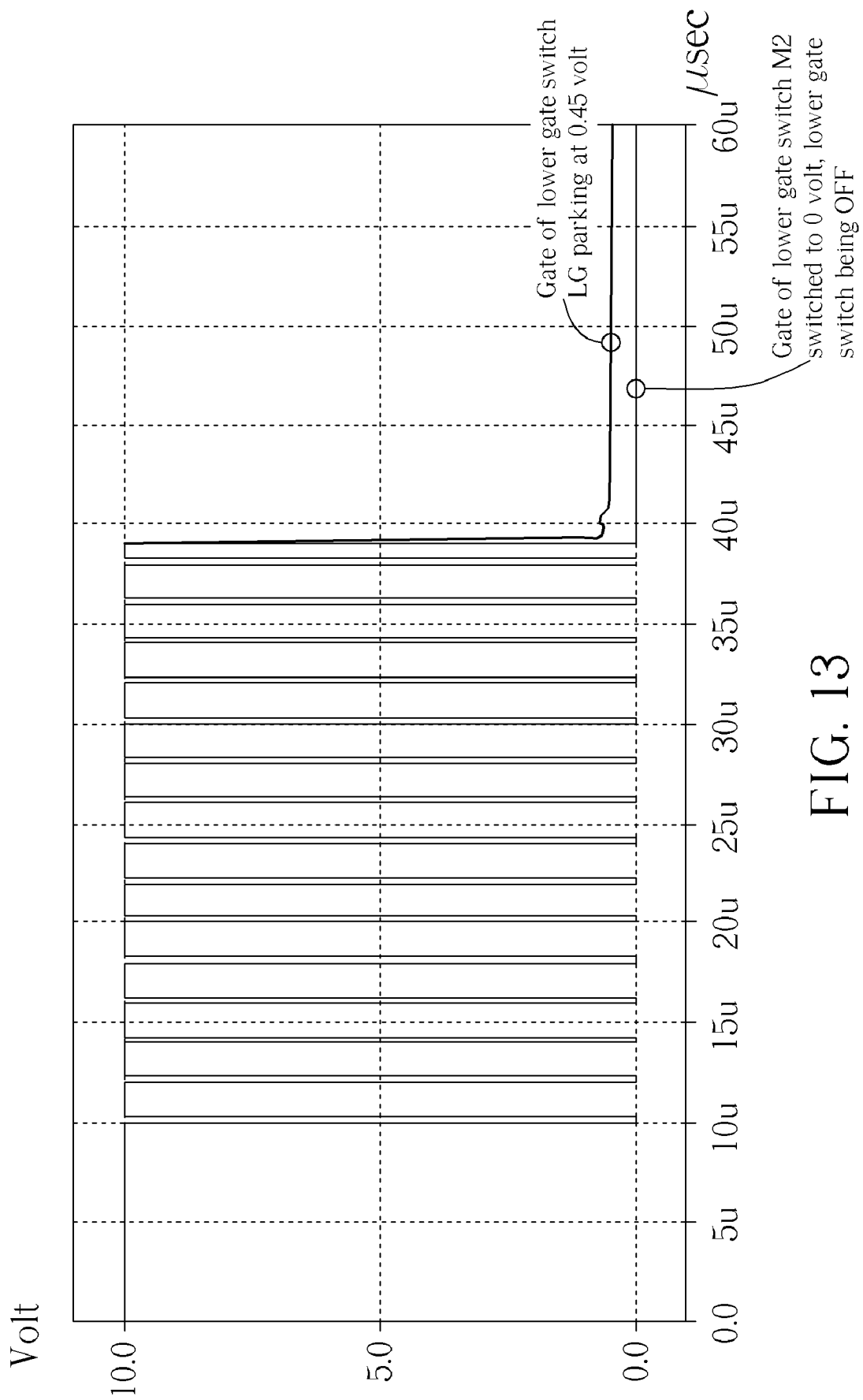
FIG. 13 illustrates a timing diagram which compares a gate voltage of a lower gate switch belonging to the switching power supply circuit of FIG. 4 and a gate voltage of a lower gate switch belonging to the switching power supply circuit of FIG. 1.

At last, please refer to FIG. 13, which illustrates a timing diagram which compares the gate voltage of the lower gate switch LG belonging to the switching power supply circuit 40 of the present invention and the gate voltage of the lower gate switch M2 belonging to the switching power supply circuit 10 according to the prior art. According to FIG. 13, the gate voltage of the lower gate switch LG will park at 0.45 volt after changing from heavy load to light load. On the other hand, the gate voltage of the lower gate switch M2 will go down to 0 volt directly and completely turn off the lower gate switch M2; a high frequency oscillations is thus produced in the endpoint SW.

Noteworthily, the upper gate switch UG and the lower gate switch LG can both be bipolar transistors. In this case, the present invention is to let the lower gate switch LG operating and switching between a fully ON and a semi-ON condition, and the performance would be the same. Also, in this case, the semi-ON state is to let the base voltage of the lower gate switch LG to be operated at about 0.45 volt.

In summary, the present invention discloses a switching power supply circuit to operate the lower gate switch in a sub-threshold voltage (gate voltage at about 0.45 volt), such that the lower gate switch works in a semi-ON state; by utilizing this circuit, a small amount of the current (about 70 μA) can still conduct while entering and operating in this semi-ON state to avoid the high frequency electromagnetic oscillations and depress the electromagnetic interference. Although, according to some embodiments of the present invention, the lower gate switch may operate in the semi-ON state when the switching power supply circuit operates in a heavy load (normal) condition, and this makes the current (about 70 μA) conducting and consumes a small amount of power. Nonetheless, compared with the more serious electromagnetic interference problem, those embodiments still show some real advantages.

The present invention applies the operating characteristics of the transistor, and operates the lower gate switch in a fully ON region and in a sub-threshold semi-ON region; therefore, when the switching power supply circuit operates in a light load condition, the electromagnetic interference previously produced by the lower gate switch can be avoided. By utilizing the present invention, the related components can expose to less electromagnetic interference, and the reliability of the electronic device can be improved.

Those skilled in the art will readily observe that numerous modifications and alterations of the device and method may be made while retaining the teachings of the invention.

What is claimed is:

1. An electronic device for delivering direct current (DC) power, comprising:
   a load;
   a power end, for receiving a power of high voltage level;
   an upper gate switch, comprising a first end coupled to the power end, a second end, and a third end, for conducting connection between the first end and the third end according to the signal level of the second end;

a lower gate switch, comprising a first end coupled to the third end of the upper gate switch, a second end, and a third end coupled to a ground, for conducting connection between the first end and the third end according to the signal level of the second end;

an inductor, comprising an end coupled to the third end of the upper gate switch and the first end of the lower gate switch, and another end coupled to the load; and a switch control unit, coupled to the second end of the upper gate switch and the second end of the lower gate switch, for switching the upper gate switch between an ON state and an OFF state, and switching the lower gate switch between an ON state and a semi-ON state, comprising:

a receiving end, for receiving a first control signal, a second control signal and a third control signal;

an inverter, for controlling the conduction of the upper gate switch according to the first control signal;

a normal state control unit, for controlling the lower gate switch according to the second control signal and the third control signal; and a sub-threshold control unit, for controlling the lower gate switch according to the third control signal.

2. The electronic device of claim 1, wherein the upper gate switch and the lower gate switch are both metal oxide field effect transistors (MOSFET).

3. The electronic device of claim 2, wherein the semi-ON state of the lower gate switch is to have the gate of the lower gate switch operated at a sub-threshold voltage.

4. The electronic device of claim 1, wherein the normal state control unit comprises:

a first switch, comprising a first end coupled to the power end, a second end coupled to the second control signal, and a third end coupled to the second end of the lower gate switch;

a second switch, comprising a first end coupled to the second end of the lower gate switch, a second end, and a third end coupled to the ground end; and an enable unit, comprising a first end coupled to the second control signal, a second end coupled to the third control signal, and a third end coupled to the second end of the second switch.

5. The electronic device of claim 4, wherein the first switch is a p-type MOSFET, the first end is a source, the second end is a gate, and third end is a drain.

6. The electronic device of claim 4, wherein the second switch is an n-type MOSFET, the first end is a drain, the second end is a gate, and third end is a source.

7. The electronic device of claim 4, wherein the enable unit comprises:

an inverter, comprising an input end coupled to the second control signal, and an output end; and an NOR gate, comprising a first input end coupled to the output end of the inverter, a second input end coupled to the third control signal, and an output end coupled to the second end of the second switch.

8. The electronic device of claim 1, wherein the sub-threshold control unit comprises:

a switch, comprising a first end, a second end couple to the third control signal, and a third end coupled to a ground; and a voltage gap unit, comprising a first end coupled to the second end of the second switch, and a second end coupled to the first end of the switch.

9. The electronic device of claim 8, wherein the switch is an n-type MOSFET, the first end is a drain, the second end is a gate, and third end is a source.

10. The electronic device of claim 8, wherein the voltage gap unit is a diode-connected n-type MOSFET, the first end is a drain and a gate connected, and the second end is a source.

11. The electronic device of claim 8, wherein the voltage gap unit is a diode, the first end is a cathode (N), and the second end is an anode (P).

12. The electronic device of claim 8, wherein the voltage gap unit is a diode-connected n-type MOSFET (NMOS), the first end is a drain and a gate connected, and the second end is a source.

13. The electronic device of claim 1, wherein the power switch is a p-type MOSFET (PMOS), and the first end is a source, the second end is a gate, and third end is a drain.

14. The electronic device of claim 1, where in the upper gate switch and the lower gate switch are bipolar transistors.

15. The electronic device of claim 14, wherein the semi-ON state of the lower gate switch is to have the base of the lower gate switch operated at a low conductive voltage.

\* \* \* \* \*